United States Patent [19]

Yamato

[11] Patent Number: 4,888,906
[45] Date of Patent: Dec. 26, 1989

[54] FISHING LINE GUIDE

[75] Inventor: Yoshiro Yamato, Sakai, Japan

[73] Assignee: Shimano Industrial Company Limited, Osaka, Japan

[21] Appl. No.: 341,222

[22] Filed: Apr. 21, 1989

[30] Foreign Application Priority Data

Apr. 23, 1988 [JP] Japan .................. 63-54736[U]

[51] Int. Cl.⁴ .................................... A01K 87/04
[52] U.S. Cl. ............................................. 43/24
[58] Field of Search ............................. 43/24

[56] References Cited

U.S. PATENT DOCUMENTS 2,914,882 12/1959 Marke ............................. 43/24
4,445,293 5/1984 Ohmura ........................... 43/24
4,507,891 4/1985 Ohmura ........................... 43/24

Primary Examiner—M. Jordan
Attorney, Agent, or Firm—Stevens, Davis, Miller & Mosher

[57] ABSTRACT

A fishing line guide comprising a guide body having holding bores and line guide rings having guide bores and mounted to the holding bores, wherein the axis of each holding bore is slanted longitudinally with respect to the axis of a fishing rod, and the inner surface of each guide bore is formed in a quarter circle in section, so that each line guide ring is mounted to the holding bore in the relation that the arcuate inner surface of the guide bore orients slantwise outwardly of the holding bore.

2 Claims, 1 Drawing Sheet

FISHING LINE GUIDE

FIELD OF THE INVENTION

The present invention relates to a fishing line guide, and more particularly to a fishing line guide mounted on the outer surface of a fishing rod so as to guide a fishing line to the tip of the fishing rod from a fishing reel mounted on the root thereof.

BACKGROUND OF THE INVENTION

Generally, the fishing line guide comprises a guide body mounted to the fishing rod and a line guide ring having a guide bore and inserted into a holding bore provided at the guide body, the line guide ring being formed of wear resistant material mainly of ceramics for guiding the line through the guide bore. The guide bore, as shown in FIG. 4, is semicircular in section at the inner surface so that the line guide ring is mounted to the guide body in a manner that the crest of the inner surface of a circular arc at the guide bore is positioned at the center of the axis thereof, thereby reducing contact resistance to the line.

When the line guide ring G is molded of ceramic, as shown in FIG. 4, a pair of slit molds C each provided with a molding projection of counter guarter circle in section, through which a front half and a rear half of a guide bore H are formed in the direction of passing the line therethrough.

When such slit molds are used, it is inevitable to cause a gap between the abutting surfaces of the slit molds, resulting in that a burr (projection) E is formed at the gap as shown in FIG. 4.

The burr E increases contact resistance of the line to the inner surface of guide bore, thereby being removed. However, the work to cut off the burr is complicated to thereby create the problem of the high manufacturing cost.

SUMMARY OF THE INVENTION

The present invention has been designed which notices that the above problem is created in that the inner surface of the guide bore is made semicircular in section in order to reduce contact resistance to the line. An object of the invention is to provide a fishing line guide which is molded without using the two slit molds, easy to mold, and guidable of the line with less contact resistance thereto.

The present invention is characterized in that the inner surface of the guide bore at the line guide ring can be simple in molding configuration of quarter circle in section without using the convetional slit molds, thereby solving the problem created in the manufacturing of the line guide ring, and that the holding bore at the same is slanted so as to avoid an increase in contact resistance to the line passing the bore, thereby guiding the line smoothly.

In detail, the fishing line guide of the invention, which is mounted on the outer surface of a fishing rod and comprises; a guide body having mounting surfaces extending lengthwise of the fishing rod and rising portions rising from the mounting surfaces respectively, the rising portions having holding bores; and line guide rings mounted therein and having guide bores respectively; so that the axis of each holding bore is slanted longitudinally with respect to the axis of the fishing rod, the guide bore at each line guide ring being formed at the inner surface in a quarter circle in section, each line guide ring being mounted to the holding bore in the relation that the arcuate inner surface of guide bore orients slantwise outwardly of the holding bore.

Since the guide bore is formed at the inner surface as above-mentioned, the line guide ring can be molded of the guide bore by use of a single mold. In other words, only one slit mold is provided with the molding projection so as to mold the guide bore without using the pair of slit molds as the conventional, thereby forming no burr.

Since each holding bore is slanted at the axis as above-mentioned, the fishing line does not contact with a right-angled edge of the guide bore, but contacts with the arcuate inner surface only, thereby being guided always smoothly with less contact resistance.

The above and further objects and novel features of the invention will more fully appear from the following detailed description when the same is read in connection with the accompanying drawings.

DETAILED DESCRIPTION OF THE INVENTION

Figure 1:
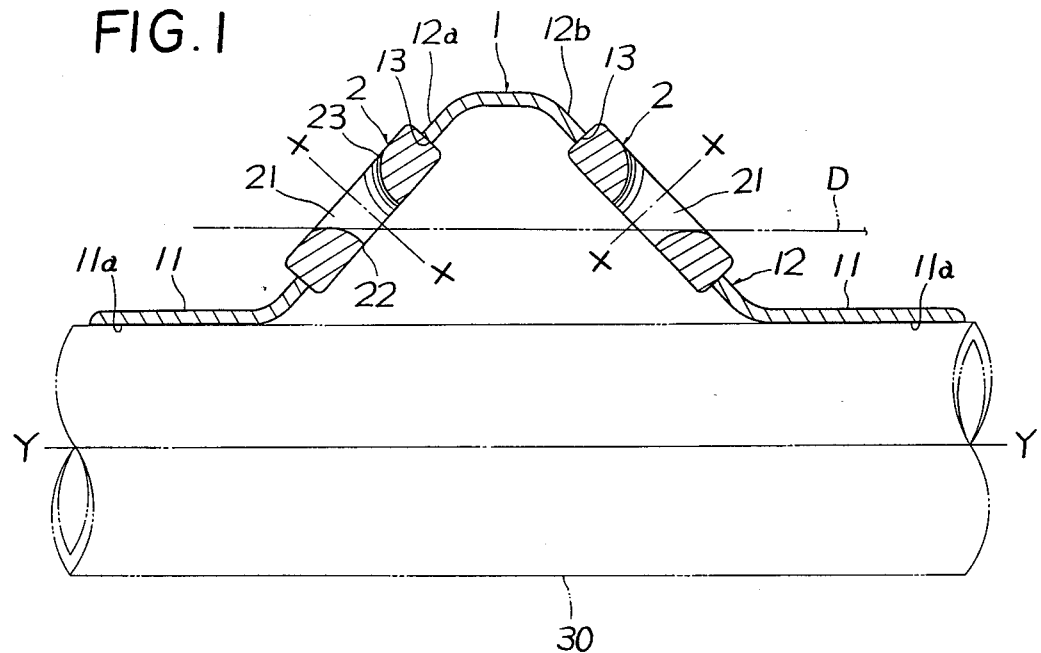
FIG. 1 is a sectional view of an embodiment of a fishing line guide of the invention.
Figure 2:
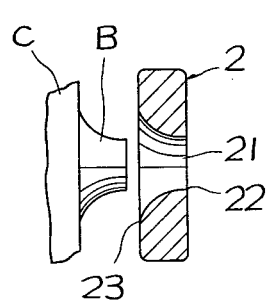
FIG. 2 is an illustration of molding a line guide ring only.
Figure 4:
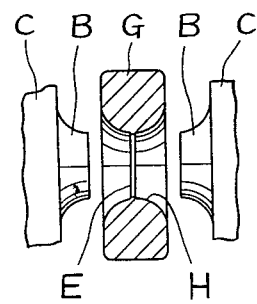
FIG. 4 is an illustration of molding the line guide ring at the conventional fishing line guide.
Figure 3:
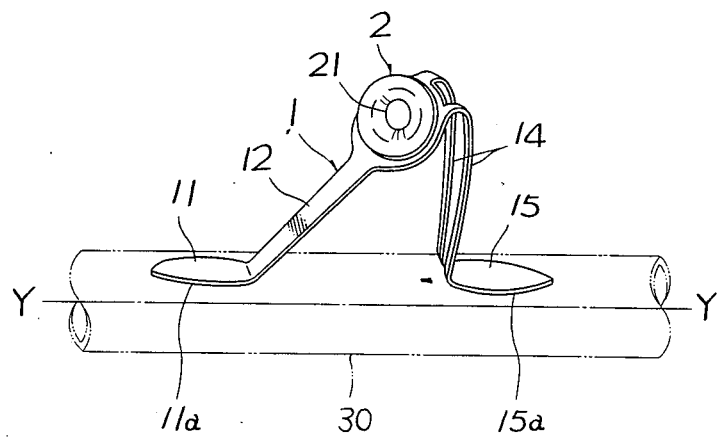
FIG. 3 is a perspective view of a modified embodiment of the invention.

In FIGS. 1 through 3, reference numeral 1 designates a guide body comprising mounting portions 11 having mounting surfaces 11a extending lengthwise of a fishing rod 30 and rising portions 12 rising from the mounting portions 11 radially outwardly of the fishing rod 30, the rising portions 12 each having on the way a holding bore 13, and 2 designates a line guide ring having a guide bore 21 through which a fishing line 40 is guided lengthwise of the fishing rod 30, and mounted to the holding bore 13.

In the embodiment of the invention in FIG. 1, the guide body 1 comprises a pair of mounting portions 11 having the mounting surfaces 11a respectively and a front rising portion 12a and a rear rising portion 12b rising slantwise from the mounting portions 11 and connected at the crest to each other, each holding bore 13 being provided on the way of the rising portion 12a or 12b.

The front rising portion 12a is slanted rearwardly upwardly and the rear rising portion 12b forwardly upwardly with respect to the mounting portions 11 respectively, whereby the holding bores 13 are provided at the rising portions 12a and 12b in such a manner that the axes X—X are slanted rearwardly and forwardly with respect to the axis Y—Y of the fishing rod 30.

The guide bore 21 at each line guide ring 2 is formed at the inner surface in section, in a quarter circle of a radius of length of guide bore 21 in the direction of passing therethrough the fishing line, in other words, a thickness of the line guide ring, thereby being of bell-mouthed shape expanding in diameter from one thicknesswise side to the other side. Accordingly, a right-angled edges 22 is formed at one thicknesswise edge of guide bore 21 and an arcuate edge 23 at the other edge.

Each line guide ring 2 is fitted into the holding bore 13 in the relation that the arcuated inner surface orients slantwise outwardly of the holding bore 13.

The guide bore 21 constructed as the above-mentioned can be molded by use of only one slit mold C having a molding projection B as shown in FIG. 3, whereby there is no fear that the burr is formed at the inner surface of guide bore 21 as conventional. Accordingly, the burr removing work can be omitted and the manufacturing cost is reducible.

Moreover, since the arcuate inner surface of the guide bore 21 orients slantwise outwardly of the holding bore 13, the fishing line 40 can smoothly be guided without contacting with the right-angled edges of guide bores 21 as shown by the phantom line in FIG. 1.

Alternatively, the line guide ring 2 may be one. In this case, it is preferable that the guide body 1 comprises a mounting portion 11 having a mounting surface 11a and a rising portion 12 having a holding bore 13 and is substantially L-like-shaped, the rising portion 12 being slanted lengthwise of the rod A with respect to the axis Y—Y thereof, and a substantially V-like-shaped leg 14 is formed in continuation of the upper end of rising portion 12, the leg 14 being provided at the utmost end with a mounting portion 15 having a mounting surface 15a extending lengthwise of the fishing rod A.

The guide body 1 is formed mainly by bending a metal plate, which is not particularly limited in material and configuration.

Also, the line guide ring 2 is formed of ceramics, which is not particularly limited in material.

As seen from the above, the fishing line guide of the invention is provided at the guide body 1 having the mounting surfaces 11a with the holding bores 13 into which the line guide rings 2 each having the guide bore 21, wherein the axis X—X of each holding bore 13 is slanted longitudinally with respect to the axis Y—Y of the fishing rod and the inner surface of each guide bore 21 is formed in a quarter circle in section, the arcuate inner surface of guide bore 21 orienting slantwise outwardly, whereby the fishing line can smoothly be guided without contacting with the right-angled edge of the guide bore 21 and no burr is formed during the molding. Hence, the burr removing work is not requied so as to reduce the entire manufacturing cost to that extent of the fishing line guide.

While a preferred embodiment of the invention has been described using specific terms, such description is for illustrative purpose only, and it is to be understood that changes and variations may be made without departing from the spirit or scope of the following claims.

What is claimed is:

1. A fishing line guide mounted on the outer surface of a fishing rod, comprising:

a guide body having a mounting surface extending lengthwise of said fishing rod and a rising portion rising from said mounting surface, and having a holding bore at said rising portion; and a line guide ring mounted to said holding bore at said guide body and having a guide bore;

so that the axis of said holding bore at said guide body is slanted longitudinally with respect to the center line of said fishing rod extending lengthwise thereof, said guide bore at said line guide ring being formed at the inner surface in a quarter circle in section, said line guide ring being mounted to said holding bore in the relation that the arcuate inner surface of said guide bore orients slantwise outwardly of said holding bore.

2. A fishing line guide according to claim 1, wherein said guide body comprises a pair of mounting portions having mounting surfaces respectively and a front mounting portion and a rear mounting portion rising from said mounting portions respectively and disposed in continuation of each other at the crest of said guide body, said rising portions having holding bores respectively, said line guide ring provided with a guide bore having the inner surface of a quarter circle in section being mounted to each of said holding bores in the relation that the arcuate inner surface of said guide bore orients slantwise outwardly of each of said holding bores.

* * * * *